United States Patent
Dar et al.

(10) Patent No.: US 11,551,095 B2
(45) Date of Patent: Jan. 10, 2023

(54) SHARING PREPROCESSING, COMPUTATIONS, AND HARDWARE RESOURCES BETWEEN MULTIPLE NEURAL NETWORKS

(71) Applicant: RUNAI LABS LTD., Tel Aviv (IL)

(72) Inventors: Ronen Dar, Even Yehuda (IL); Micha Anholt, Tel Aviv (IL)

(73) Assignee: RUNAI LABS LTD., Tel Aviv (IL)

( * ) Notice: Subject to any disclaimer, the term of this patent is extended or adjusted under 35 U.S.C. 154(b) by 603 days.

(21) Appl. No.: 16/660,874

(22) Filed: Oct. 23, 2019

(65) Prior Publication Data

US 2020/0134467 A1    Apr. 30, 2020

Related U.S. Application Data

(60) Provisional application No. 62/750,295, filed on Oct. 25, 2018.

(51) Int. Cl.
   *G06N 3/08*       (2006.01)
   *G06F 9/38*       (2018.01)
   *G06F 9/50*       (2006.01)

(52) U.S. Cl.
   CPC .......... *G06N 3/084* (2013.01); *G06F 9/3885* (2013.01); *G06F 9/5066* (2013.01)

(58) Field of Classification Search
   CPC ...... G06N 3/084; G06N 3/063; G06F 9/3885; G06F 9/5066; G06F 9/5033
   See application file for complete search history.

(56) References Cited

U.S. PATENT DOCUMENTS

| | | | | |
|---|---|---|---|---|
| 5,479,573 A | * | 12/1995 | Keeler | G06N 3/0472 706/21 |
| 2019/0101927 A1 | * | 4/2019 | Zhao | G05D 1/0088 |

OTHER PUBLICATIONS

McGregor et al., "Scheduling Algorithms for Effective Thread Pairing on Hybrid Multiprocessors", Proceedings of the 19th IEEE International Parallel and Distributed Processing Symposium (IPDPS'05), pp. 1-11, May 2005.

Stack Overflow, "How can you train multiple neural networks simultaneously in noleam/lasagne/theano on Python?", 1 page, 2016 (downloaded from https://stackoverflow.com/questions/35135331/how-can-you-train-multiple-neural-networks-simultaneously-in-nolearn-lasagne-the).

Narayanan et al., "Accelerating Deep Learning Workloads through Efficient Multi-Model Execution", NeurIPS Workshop on Systems for Machine Learning, Stanford University, Microsoft Research, pp. 1-8, Dec. 2018.

(Continued)

*Primary Examiner* — Jamal Javaid
(74) *Attorney, Agent, or Firm* — Kligler & Associates Patent Attorneys Ltd

(57) ABSTRACT

A method for training a Neural-Network (NN), the method includes receiving a plurality of NN training tasks, each training task including (i) a respective preprocessing phase that preprocesses data to be provided as input data to the NN, and (ii) a respective computation phase that trains the NN using the preprocessed data. The plurality of NN training tasks is executed, including: (a) a commonality is identified between the input data required by computation phases of two or more of the training tasks, and (b) in response to identifying the commonality, one or more preprocessing phases are executed that produce the input data jointly for the two or more training tasks.

20 Claims, 3 Drawing Sheets

(56) References Cited

OTHER PUBLICATIONS

Kashefy, "Training Networks in Parallel via a Single Solver", pp. 1-8, Mar. 16, 2016 (downloaded from https://github.com/nigroup/nideep/blob/master/examples/parallel_train/verify_parallel_training.ipynb).

Stack Overflow, "Train multiple neural nets in parallel on CPU in keras", pp. 1-4, year 2018 (downloaded from https://stackoverflow.com/questions/48961330/train-multiple-neural-nets-in-parallel-on-cpu-in-keras).

Keras Documentation, "Image Preprocessing", pp. 1-4, Jul. 20, 2018 downloaded from https://web.archive.org/web/20180720080821/https://keras.io/preprocessing/image/).

Keras Documentation, "Sequence Preprocessing", pp. 1-3, Jun. 21, 2018 (downloaded from https://web.archive.org/web/20180621051031/https://keras.io/preprocessing/sequence/).

Keras Documentation, "Text Preprocessing", pp. 1-3, Jul. 5, 2018 (downloaded from https://web.archive.org/web/20180705065725/https://keras.io/preprocessing/text/).

\* cited by examiner

SHARING PREPROCESSING, COMPUTATIONS, AND HARDWARE RESOURCES BETWEEN MULTIPLE NEURAL NETWORKS

CROSS-REFERENCE TO RELATED APPLICATIONS

This application the benefit of U.S. Provisional Patent Application 62/750,295, filed Oct. 25, 2018, whose disclosure is incorporated herein by reference.

FIELD OF THE INVENTION

The present invention relates generally to processing architectures for machine learning, and particularly to distributed parallel processing architectures for training and inference in a neural network.

BACKGROUND OF THE INVENTION

Various methods for training a neural network were previously proposed in the patent literature. For example, U.S. Pat. No. 5,479,573 describes a predictive neural network for operating in a runtime mode and in a training mode. The network includes a preprocessor for preprocessing input data in accordance with parameters stored in a storage device for output as preprocessed data to a delay device. The delay device provides a predetermined amount of delay as defined by predetermined delay settings in a storage device. The delayed data is input to a system model which is operable in a training mode or a runtime mode. In the training mode, training data is stored in a data file and retrieved therefrom for preprocessing and delay and then input to the system model. Model parameters are learned and then stored in the storage device. During the training mode, the preprocess parameters are defined and stored in a storage device in a particular sequence and delay settings are determined in the storage device. During the runtime mode, runtime data is derived from a distributed control system and then preprocessed in accordance with predetermined process parameters and delayed in accordance with the predetermined delay settings. The preprocessed data is then input to the system model to provide a predicted output, which a control output to the distributed control system.

As another example, PCT Patent Publication application WO2017176356 describes a method including partitioning, based at least on a resource constraint of a platform, a global machine learning model into a plurality of local machine learning models; transforming training data to at least conform to the resource constraint of the platform; and training the global machine learning model by at least processing, at the platform, the transformed training data with a first of the plurality of local machine learning models. In some embodiments, a data transformer is configured to preprocess data that is to be processed by a local machine learning model at a client device. For instance, the data may be raw data (e.g., collected by one or more sensors at a client device) having a high dimensionality. Thus, the preprocessing of the data may to conform to the resource constraints of the client device. Preprocessing the data may render the data more suitable for processing by the plurality of local machine learning models.

SUMMARY OF THE INVENTION

An embodiment of the present invention provides a method for training a Neural-Network (NN), the method including receiving a plurality of NN training tasks, each training task including (i) a respective preprocessing phase that preprocesses data to be provided as input data to the NN, and (ii) a respective computation phase that trains the NN using the preprocessed data. The plurality of NN training tasks is executed, including: (a) a commonality is identified between the input data required by computation phases of two or more of the training tasks, and (b) in response to identifying the commonality, one or more preprocessing phases are executed that produce the input data jointly for the two or more training tasks.

In some embodiments, executing the plurality of NN training tasks includes, in response to identifying the commonality, assigning two or more computation tasks to a same group of one or more processors.

In some embodiments, computation phases of the training tasks are executed by multiple processors, and executing the plurality of NN training tasks includes assigning the computation phases to the processors in accordance with a predefined assignment criterion.

In an embodiment, the assignment criterion aims to minimize a total execution time of the training tasks. In another embodiment, the assignment criterion aims to minimize idle times during computation phases.

In some embodiments, assigning the computation phases includes estimating durations of execution of the computation phases, and assigning the computation phases to the processors based on the durations of execution.

In some embodiments, estimating the durations includes re-estimating the durations during execution of the computation phases, and reassigning one or more of the computation phases to the processors based on the re-estimated durations of execution.

In an embodiment, preprocessing phases of the training tasks are executed by multiple processors, and executing the plurality of NN training tasks includes assigning the preprocessing phases to the processors in accordance with a predefined assignment criterion.

In another embodiment, the assignment criterion aims to minimize a total execution time of the training tasks.

In yet another embodiment, assigning the preprocessing phases includes estimating durations of execution of the preprocessing phases, and assigning the preprocessing phases to the processors based on the durations of execution.

In some embodiments, receiving the plurality of NN training tasks includes deciding on a maximal number of training tasks for which to produce the input data jointly, based on a total execution time of the training tasks.

There is additionally provided, in accordance with an embodiment of the present invention, a system for training a Neural-Network (NN), the system including an interface and one or more processors. The interface is configured to receive a plurality of NN training tasks, each training task including (i) a respective preprocessing phase that preprocesses data to be provided as input data to the NN, and (ii) a respective computation phase that trains the NN using the preprocessed data. The one or more processors are configured to execute the plurality of NN training tasks, including: (a) identifying a commonality between the input data required by computation phases of two or more of the training tasks, and in response to identifying the commonality, executing one or more preprocessing phases that produce the input data jointly for the two or more training tasks.

There is further provided, in accordance with an embodiment of the present invention, a computer software product, the product including a tangible non-transitory computerreadable medium in which program instructions are stored, which instructions, when read by one or more processors, cause the one or more processors to: (a) receive a plurality of NN training tasks, each training task comprising (i) a respective preprocessing phase that preprocesses data to be provided as input data to the NN, and (ii) a respective computation phase that trains the NN using the preprocessed data, and (b) execute the plurality of NN training tasks, including: (i) identifying a commonality between the input data required by computation phases of two or more of the training tasks, and (ii) in response to identifying the commonality, executing one or more preprocessing phases that produce the input data jointly for the two or more training tasks.

The present invention will be more fully understood from the following detailed description of the embodiments thereof, taken together with the drawings in which:

DETAILED DESCRIPTION OF EMBODIMENTS

Overview

Figure 1:
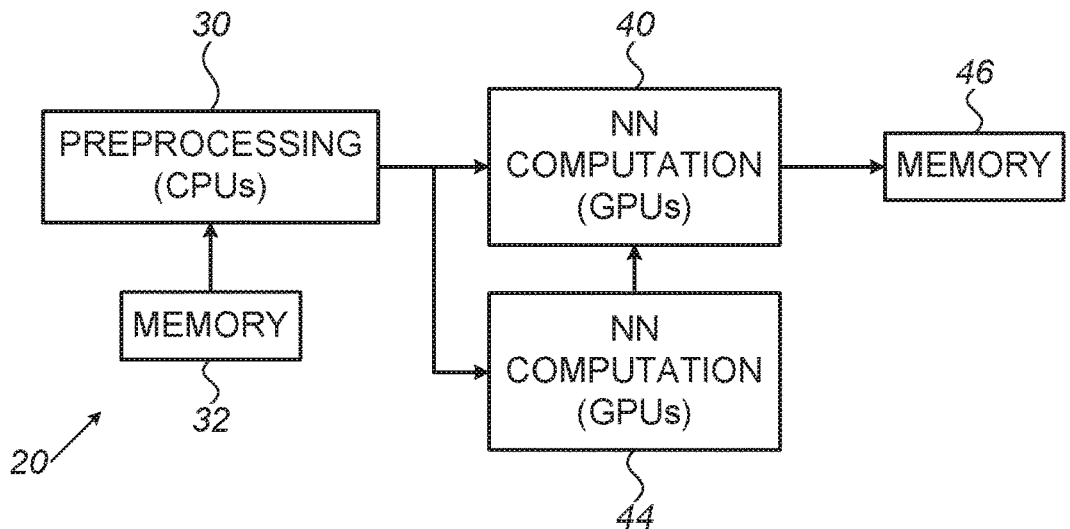
FIG. 1 is a schematic block diagram of a computing system configured to run training tasks for a neural network (NN), in accordance with an embodiment of the present invention.

Neural networks (NNs) are used for a wide variety of applications. Typically, NNs are configured to interpret raw data sets, and, for this task, supervised NNs (i.e., NNs that use a training dataset having a known target value for learning) may classify input data based on a NN model learned from a labeled training dataset. A supervised NN model can be described as composed of several layers that progressively process input data using the aforementioned labeled dataset with which to train. Each layer of the NN model is made of nodes where computation takes place, with the node combining input from the data or from previous nodes/layers with a set of coefficients, also referred to as weights, that either amplify or dampen that values, thereby assigning significance to values with regard to the task the algorithm is trying to learn, e.g., which values are most helpful in classifying data without error.

Commonly, each step in the training process of NN' includes two phases: preprocessing and NN computation.

In the preprocessing phase, the input to the NN is prepared, including, for example, (i) data fetching, e.g., reading the data from local or remote storage, and (ii) data augmentation and randomization, such as resizing images and performing random rotations, random cropping, and the like. The data preprocessing stage is typically performed by a Central Processing Unit (CPU), but can also be done on any other processing device. For simplicity, the term CPU is used hereinafter, but the concept can be generalized to any other type of preprocessing hardware or software. Moreover, as further described below, non-trainable NN layers that are shared between multiple tasks can also be regarded as part of preprocessing.

In a typical NN computation phase, the NN algorithm performs a forward propagation, including the use of trainable and/or non-trainable NN layers, in which the input to the NN is processed, and prediction of a target value is made. Forward propagation is followed by a back-propagation process in which the prediction error is evaluated, and updates (e.g., updated weights) to the model are computed based on the prediction error.

The NN training may be performed using dedicated hardware (e.g., GPU, TPU) that runs a software, such as "tensorflow," "pytorch," and others. These software products use specially tuned primitives (i.e., processing kernels) with high utilization and efficiency on high performance hardware. The NN computation stage is typically performed on high-end computing machines, e.g., using Graphics Processing Unit (GPU) or Tensor Processing (TPU) platforms. Currently, GPUs are the most popular platform for NN training. For simplicity, the term GPU is used hereinafter, although the concept can be generalized to other types of acceleration hardware.

One of the basic challenges of using NNs is that the NN training process is lengthy and exceptionally compute-intensive. Training NNs is an iterative process that involves going multiple times through a training dataset. Each such iteration, commonly referred to as an epoch, includes many small steps wherein, during each step, the NN is being trained on a subset batch of the dataset. Each step includes the aforementioned preprocessing stage in which the subset data batch is prepared and transferred to the NN for computation. Moreover, developing NN-based technology may involve running many repeated training tasks using the same dataset and the same preprocessing algorithm but with possibly different NNs. One example is the process called hyper-parameter tuning, or hyper-parameter optimization, which is designed to experiment with many different NNs configurations in order to optimize the NN architecture.

Preprocessing phases typically run in parallel to computation phases and may create a bottleneck in the pipeline. In many cases, there is a pipeline of preprocessing and computation tasks, and preprocessing of a next step runs in parallel to the computation of the current step. Some example scenarios for bottlenecks caused by preprocessing are:

The data needs to be read from disk or from remote servers.
The preprocessing is performed on low-end CPUs.
The preprocessing is performed on a distributed computing system, which creates latency and increases the preprocessing time.

When the duration of a preprocessing time is longer than the duration of the respective NN computation time, the high-end GPUs (or other platforms that run the NN computation) may become idle. As a result, the total time and cost of training the NN increases.

Embodiments of the present invention that are described hereinafter utilize similarity between different training tasks to optimize a total running time and cost of the NN training process. In a general setting, the disclosed techniques provide a system that accepts a list of training tasks, each using some dataset and preprocessing algorithm. The system allocates groups of training tasks to run together on a same hardware while sharing parts of the preprocessing and/or NN computation.

The system can be optimized to achieve a shortest training time or to achieve a training task at a lower training cost. When running training tasks on public cloud machines, for example, the training cost is the cost of the consumed computing resources. When running training tasks on private cloud machines or local machines, the training cost can be viewed as the utilization of consumed computing resources. Such utilization may be weighted differently with different computing platforms, for example, based on cost of processing time per processor type (e.g., cost of idle time). In general, training cost can be any metric of the training process that can be minimized.

In some embodiments, a method for training a neural network is provided that includes (a) receiving a plurality of NN training tasks, each training task comprising preprocessing phase that preprocesses data to be provided as input data to the NN, and (ii) a computation phase that trains the NN using the preprocessed data, and (b)) executing the plurality of NN training tasks, including (i) identifying a commonality between the input data required by computation phases of two or more of the training tasks, and (ii) executing one or more preprocessing phases that produce the input data jointly for the two or more training tasks in response to identifying a commonality (i.e., preprocessing a shared portion of the input data). Example of identifying such commonalty is by inspecting fields and field entries in a configuration file which can be common to all NN to be trained (i.e., sharable), or, be NN specific (i.e., non-sharable).

In some embodiments, executing the plurality of NN training tasks comprises, in response to identifying the commonality, assigning two or more computation tasks to a same group of one or more processors.

By providing improved methods for training NNs, the closed techniques may increase an availability of deep-learning-based products, such as artificial intelligence products which are based on learning methods, and improve hardware utilization.

System Description

FIG. 1 is a schematic block diagram of a computing system 20 configured to run training tasks for a neural network (NN), in accordance with an embodiment of the present invention. Typically, system 20 uses preprocessed data to train multiple NNs in parallel so as to identify a most suitable NN architecture for the tasks the NN is trained to handle which is typical for example in hyper parameter optimization.

System 20 comprises a processing unit 30 comprising one or more CPUs that are configured to preprocess training data uploaded from a memory 32 or from a remote storage device (not shown). The preprocessed data is subsequently provided as input data to the NNs. Processing unit 30 and/or memory 32 may be remote from, the rest of system 20, in which case preprocessing durations may be prolonged due to upload times, communication latencies, and so forth. Additionally or alternatively, data can be uploaded from a remote storage and preprocessed on a CPU close to the GPU.

A pair of high-performance processing units 40 and 44, each comprising a given number of, for example, GPUs or TPUs, compute the NNs using the preprocessed data, and then outputs, for example via unit 40, a set of values of the trained NN, such as weights of the NN, and stores the values in a memory 46 for future use of the trained NN.

The configuration of system 20 is brought by way of example. Other configurations of system 20 are possible, including, for example, several preprocessing units 30.

Typically, the various processors in system 20, e.g., CPUs and GPUs, comprise programmable processors that are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2A:
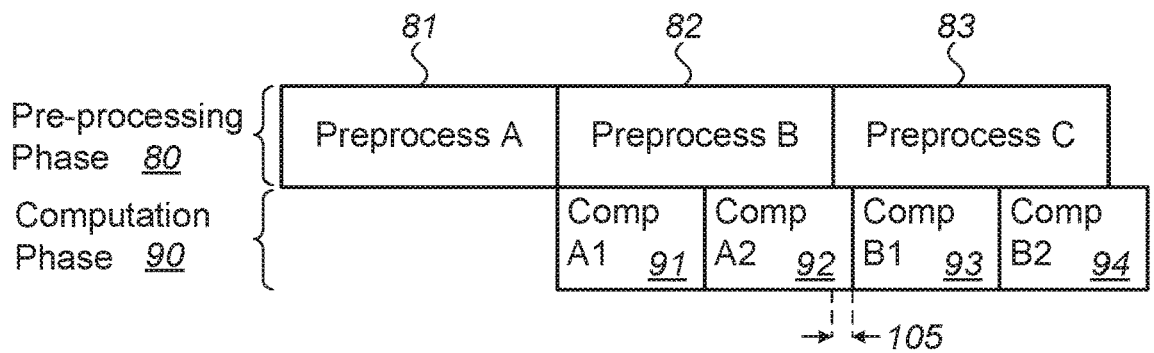
FIGS. 2A and 2B are diagrams showing timelines of preprocessing and computation phases of multiple training tasks including sharable and non-sharable preprocessing portions, in accordance with embodiments of the present invention.
Figure 2B:
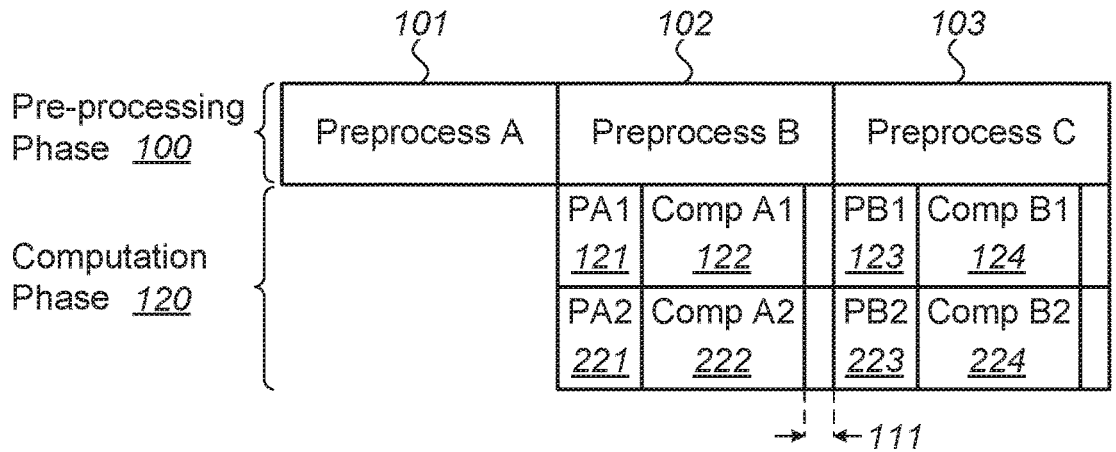

Sharing Preprocessing, Computations, and Hardware Resources Between Multiple Neural Networks FIGS. 2A and 2B are diagrams timelines of preprocessing phases 80 and 100, and computation phases 90 and 120, respectively, of multiple training tasks, including sharable and non-sharable preprocessing portions, in accordance with embodiments of the present invention.

In FIG. 2A, the training tasks jointly comprise a preprocessing phase 80 and a computation phase 90. As seen, preprocessing phase 80 comprises a time block 81 for preprocessing batch A (Preprocess A) followed by time blocks 82 and 83 for preprocessing batches B and C (Preprocess B, Preprocess C), and so on. In the shown example, preprocessing is performed by a single processing unit, for example by processing unit 30 of FIG. 1.

The timeline of computation phase 90 comprises two pairs of separate preprocessing-related computation tasks ("A1" and "A2" using preprocessing A, and "B1" and "B2" using preprocessing B), which are computed in series by a separate single high-performance processing unit, such as computation unit 40 of FIG. 1.

In FIG. 2A, computation phases of the training tasks is executed by a single processor, and executing the plurality of NN training tasks comprises assigning the computation phases (e.g., Comp A1 91, Comp A2 92, and Comp B1 93, Comp B2 94) to the processor in accordance with a predefined assignment criterion, for example, to maximize resource utilization, which is equivalent to minimizing costs. Assigning the computation phases comprises estimating durations of execution of the computation phases. Durations may be estimated from past runs, from "calibration" test run, and could be adjusted during runs, and assigning the computation phases to the processors based on the durations of execution. An assignment criterion can thus be aiming at minimizing idle times in computation phases, and typically thereby, at minimizing costs (e.g., amounts of payments) for resource consumption when running in processor network, such as a public cloud.

As seen, by the time the high-performance processing unit finish computation of training tasks "A1" and "A2" using preprocessed batch A, the preprocessing of batch B in time block 82 is already completed, and awaits time duration 105 for the high-performance processing unit to finish computation task A2 92, so there is no time duration during which the computation phase is halted to await an unfinished preprocessing phase (e.g., of batch B).

Next, the high-performance processing unit trains the NN with preprocessed batch B, at computation time blocks 93 and 94 (Comp B1 and Comp B2), and so on.

As shown in FIG. 2A, in some embodiments, even without identifying a commonality, the hardware can be optimized for minimal cost (idle times are minimized and a single GPU is used instead of two). In another embodiment, running compA1 and compA2 on two different GPUs would result in minimal total execution time (time duration 105 would be zero) but potentially higher cost due to the use of two GPUs.

In FIG. 2B, the training tasks jointly comprises a preprocessing phase 100 and a computation phase 120. As seen, preprocessing phase 100 comprises a time block 101 for preprocessing batch A (Preprocess A) followed by time blocks 102 and 103 for preprocessing batches B and C (Preprocess B, Preprocess C), and so on. In the shown example, preprocessing is performed by a single processing unit, for example, by processing unit 30 of FIG. 1.

The timeline of computation phase 120 comprises also two pairs of separate preprocessing-related computation tasks ("A1" and "A2" using preprocessing A, and "B1" and "B2" using preprocessing B). As seen each pair of tasks A and B is computed in parallel by separate high-performance processing units, such as computation units 40 and 44 of FIG. 1.

In the example of FIG. 2B, preprocessing batch A comprises a sharable portion and a non-sharable portion. In the present context, the term "sharable portion" means a portion of the preprocessed data that is usable as input to multiple NN computation tasks (e.g., sharable between multiple NN computation tasks, for training of multiple NNs). The term "non-sharable portion" means a portion of the preprocessed data that is usable (e.g., sharable) as input to only a single NN computation task, for training of a single NN.

In FIG. 2B, computation phases of the training tasks are executed by multiple processors, and executing the plurality of NN training tasks comprises assigning the computation phases (e.g., PA1, PA2, and Comp A1, Comp A2) to the processors in accordance with a predefined assignment criterion, such as an assignment criterion aiming at minimizing a total execution time of the computation phases. A predefined assignment criterion, for example, to maximize resource utilization, is to minimize duration of idle times, such duration 111, of high-end computing machines. Assigning the computation phases comprises estimating durations of execution of the computation phases, and assigning the computation phases to the processors based on the durations of execution.

In other embodiments, the shared preprocessing phase, which is similar for all computation tasks, is followed by a preprocessing which is unique for each computation task (i.e., Preprocess A→PA1→Comp A1, and Preprocess A→PA2→Comp A2).

Figure 4:
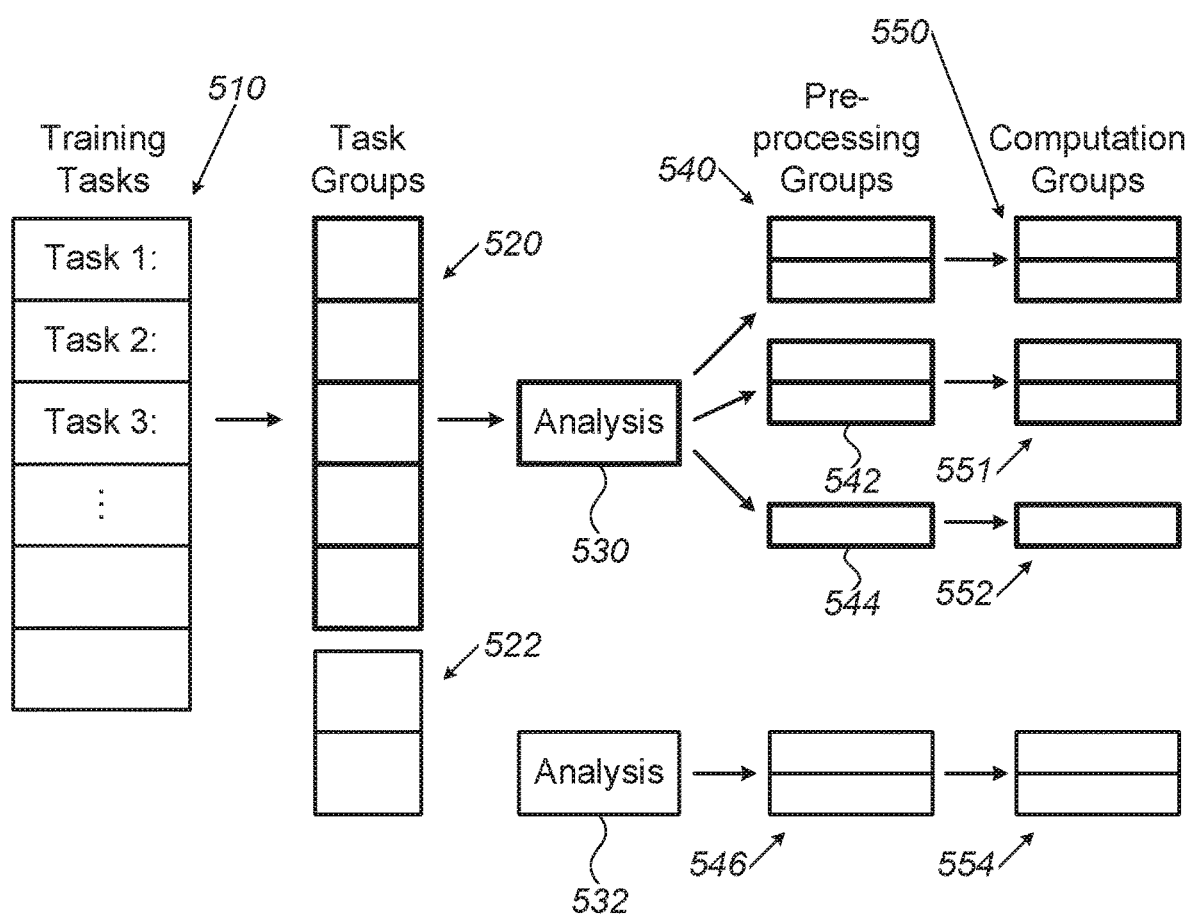
FIG. 4 is a flow chart showing a work-flow for training neural networks including allocation of resources of a computing system per a given number of training tasks, in accordance with an embodiment of the present invention.

In some embodiments, the tasks are assigned, as shown in FIG. 4, to the processors in accordance with a predefined assignment criterion, such as an assignment criterion aiming at minimizing the overall total execution time of the preprocessing and computation phases (also called hereinafter, "total execution time of the training"). For example, in FIG. 2B, the total execution time of the training, assuming only training batches A and B involved, is the time between the beginning of block 101 to the end of block 224. Assigning the tasks comprises estimating durations of execution of the tasks, and assigning the tasks to the processors based on the durations of execution that are summed into the total duration. In some cases, if the total duration exceeds a preset maximal training time, one or more NN training models can be omitted from (i.e., not used in) the training, such as by dropping blocks group (121, 122 123, 124) or block group (221, 222, 223 and 224) of FIG. 2B.

As seen, the computation over batch A is split, where, as a first step, each computation unit trains the NNs with the shared preprocessed portion of batch A, during computation time blocks 121 (PA1) and 221 (PA2). Next, each processing unit trains the NNs with the non-shared preprocessed portion of batch A at computation time blocks 122 (Comp A1) and 222 (Comp A2), respectively. Note that, in some cases, an entire preprocessed batch may be sharable, and then the computation time of blocks 121 and 221 (PA1 and PA2) occupy, by definition, zero time.

As seen, by the time the high-performance processing units finish computation of training tasks "A1" and "A2" using batch A, the preprocessing of batch B in time block 102 is nearly completed, so an idle time 111 of the high-performance processing units, i.e., a time duration during which the computation phase is halted to await an unfinished preprocessing phase, is minimal.

Using preprocessed batch B, the training process continues with each processing unit training the NNs with a shared preprocessed portion of batch B, at computation time blocks 123 (PB1) 123 and 223 (PB2). Next, each processing unit trains the NNs with a same, i.e., non-shared, preprocessed portion of batch B, at computation time blocks 124 (Comp B1) and 224 (Comp B2), respectively, and so on.

Figure 3A:
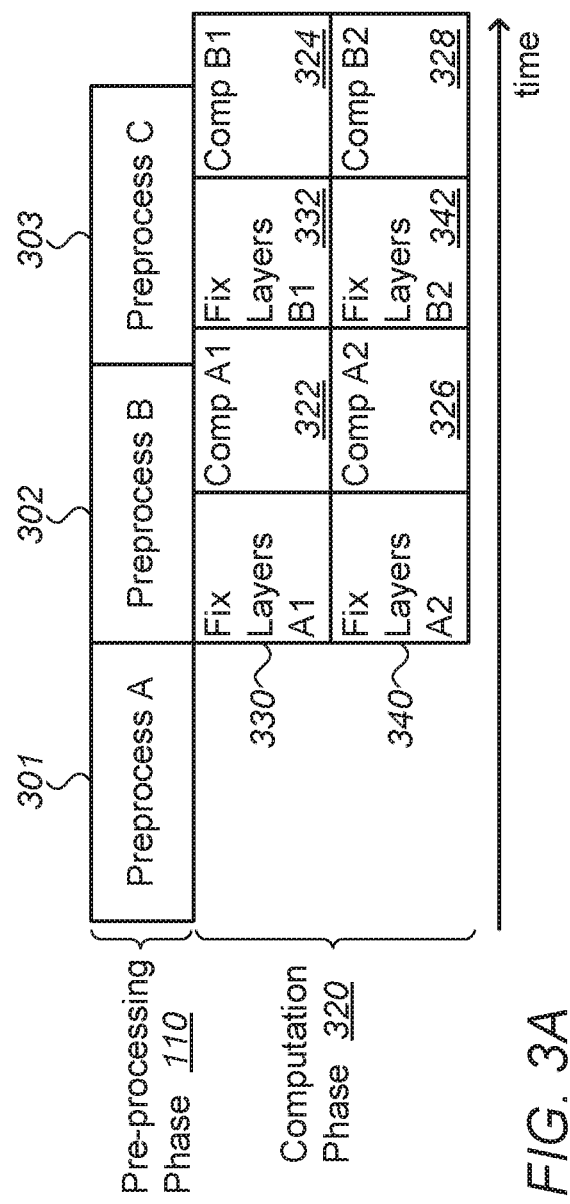
FIGS. 3A and 3B are diagrams showing timelines of preprocessing and computation phases of multiple training tasks that include computation of non-trainable and trainable portions of neural networks, in accordance with other embodiments of the present invention.
Figure 3B:
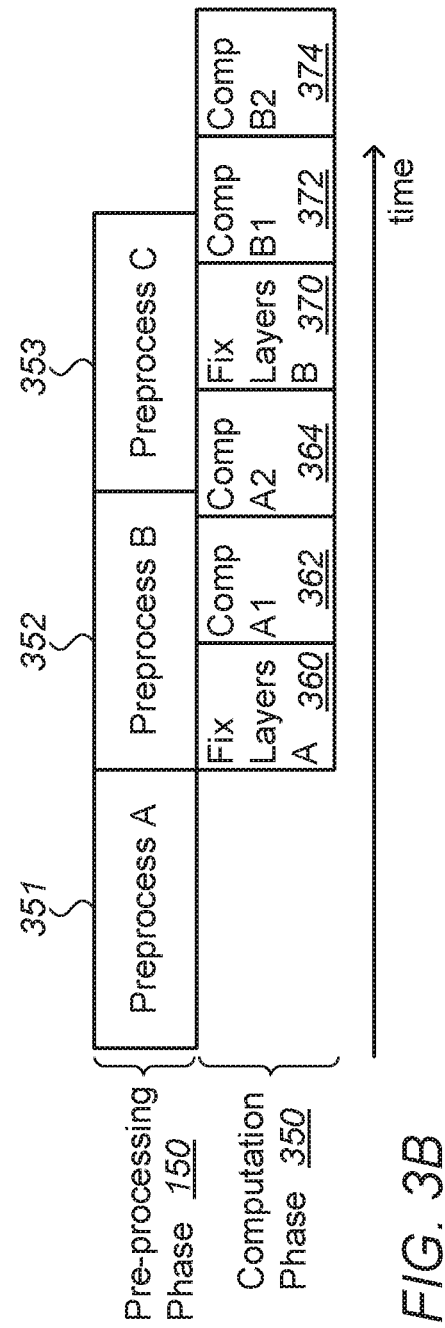

FIGS. 3A and 3B are diagrams showing timelines of preprocessing phases 110 and 150, and a computation phases 320 and 350, respectively, of multiple training tasks that include computation of non-trainable and trainable portions of neural networks (NN), in accordance with other embodiments of the present invention. In the present context, the term "non-trainable portion" means layers of the NN that are not changing by the computation, and the term "trainable portion" means layers of the NN that may change by the computation, for example, by changing of weights in a layer. An example of a non-trainable portion of an NN is a number of first layers having prespecified fixed weights, such that the computation phase on these layers is done without back propagation.

As seen in FIG. 3A, the preprocessing timeline includes a time block 301 of preprocessing of batch A (Preprocess A) followed by time blocks 302 and 303 for preprocessing batches B and C (Preprocess B, Preprocess C), and so on. In the shown example, the preprocessing is performed by a single processing unit, for example, by processing unit 30 of FIG. 1.

Moreover, in case that two or more tasks share a same preprocessing and share a same non-trainable, "fix layers," portion of an NN and known values of the weights of the fix layers, a single CPU or a single GPU may perform the preprocessing and the computation of the shared non-trainable portion, wherein the later (e.g., blocks 330, 340, 332 and 342) can be viewed as part of the preprocessing.

The timeline of computation phase 320 comprises two computation tasks ("1" and "2"), which are computed in parallel by separate high-performance processing units, such as computation units 40 and 44 of FIG. 1.

As further seen in FIG. 3A, the computation over batch A is split, where, at a first step, each processing unit calculates an output of a non-trainable portion of the NNs using the shared preprocessed batch A as an input, during computation time blocks 330 (non-trainable, Fix layers A1) and 340 (non-trainable, Fix layers A2), which involves no training. Next, each processing unit trains a variable portion of the NNs, using preprocessed batch at computation time blocks 322 (Compute A1) and 326 (Compute A2), respectively.

As seen, by the time the high-performance processing units finish training tasks "1" and "2" using batch A, the preprocessing of batch B during time block 302 (Preprocess B) has completed, resulting in no idle time for the high-performance processing units.

Using batch B, the training process continues with each processing unit computing an output of a non-trainable portion of the NNs with preprocessed batch B as an input, at computation time blocks 332 (Fix layers B1) and 342 (Fix layers B2). Next, each processing unit trains the NN with preprocessed batch B, at computation time blocks 324 (Compute B1) and 328 (Compute B2), respectively, and so on.

In FIG. 3B, the preprocessing timeline includes a time block 351 of preprocessing of batch A (Preprocess followed by time blocks 352 and 353 for preprocessing batches B and C (Preprocess B, Preprocess C), and so on. In the shown example, the preprocessing is also performed by a single processing unit, for example, by processing unit 30 of FIG. 1.

The timeline of computation phase 350 comprises multiple computation tasks, which are computed in series by a single high-performance processing unit, such as computation unit 40 of FIG. 1.

As further seen in FIG. 3B, the computation over batch A is split, where, at a first step, each processing unit calculates an output of a non-trainable portion of the NNs using the shared preprocessed batch A as an input, during computation time block 360 (non-trainable Fix layers A), which involves no training. Next, each processing unit trains a variable portion of the NNs in series, using preprocessed batch A, at computation time blocks 362 (Compute A1) and 364 (Compute A2), respectively.

As seen, by the time the high-performance processing units finish training tasks "1" and "2" using batch A, the preprocessing of batch B during time block 352 (Preprocess B) is mostly completed, resulting in minimal idle time for the high-performance processing unit.

Using batch B, the training process continues with each processing unit computing an output of a non-trainable portion of the NNs with preprocessed batch B as an input, at computation time block 370 (Fix layers B). Next, each processing unit trains the NN with preprocessed batch B in series, at computation time blocks 372 (Compute B1) and 374 (Compute B2), respectively, and so on.

In the embodiment shown by FIG. 3B also, the computation of the non-trainable portions 360 and 370 can be viewed as part of the preprocessing.

The timelines of FIGS. 2 and 3 are brought by way of example and purely for the sake of conceptual clarity. Any other suitable configurations can be used in alternative embodiments. For example, the disclosed techniques can also be carried out using parallel preprocessing to further shorten preprocessing duration, e.g., with time blocks 101 (Preprocess A), 102 (Preprocess B), etc., at least partially overlapping one another in time. In another embodiment, the disclosed techniques can also be carried out using parallel computation to further shorten computation duration, e.g., with each block 121 (PA1), 122 (Comp A1), 123 (PB1), 124 (Comp B1), 221 (PA2), 222 (Comp A2), 223 (PB2), 224 (Comp B2), etc., running on multiple GPUs.

FIG. 4 is a flow chart showing a work-flow for training neural networks (NN) including allocation of resources of a distributed computing system per a given number of training tasks, in accordance with an embodiment of the present invention.

In the shown embodiment, at a training task stage 510, the computing system accepts a list of training tasks to run, as well as any other information needed for the analysis stage.

A processor of the system (e.g., a CPU in preprocessing unit 30) splits the tasks into task-groups the present example two groups denoted 520, 522). Each group of tasks may have some shared preprocessing portion to be determined.

In analysis stages (530, 532), the processor splits tasks within each group (520, 522) among preprocessing groups 540, 542, 544, and 546 so as to optimize preprocessing running time.

In some embodiments, the estimation of durations of execution of the computation phases is done dynamically as training progresses. The estimation process then comprises re-estimating the durations during computation, and reassigning the computation phases to the processors based on the re-estimated durations of execution. For example, when preprocessed data is shared between tasks, the preprocessing runtime may change during computation phase of training since runtime may depend on network load and configuration. In this case an algorithm, which can be an external executable communicating with the training programs or a function that is run during a shared part of preprocessing and training, can dynamically receive information reported by the NN, such as typically reported parameters at every beginning or end of a step or an epoch, on the runtimes of the shared and non-shared parts and modify "Execution groups". The algorithm can then stop training runs, optimize their resource allocation and grouping, and rerun them accordingly. The new runs can continue from previous state by using a suitable checkpoint and recovery mechanism.

Next, preprocessing groups 540, 542, 544, and 546 serve as input for computation groups 550, 551, 552, and 554. The partitioning into groups 550, 551, 552, and 554 aims to optimize the overall cost of training.

For example, computation group 550 may receive two training tasks, each having a shared preprocessed portion (in the present example preprocessing group 540) and run on eight Nvidia k80 GPUs, allocating six GPUs to the first training task, two GPUs to the second task, and so on. Computation group 551 may receive a single training task (in the present example preprocessing group 542) and run on a single Nvidia v100 GPU only. In other embodiments, such as shown by FIG. 2A, Computation group 551 may comprise a single GPU for performing the two training tasks in series.

Computation group 552 may receive a single training task (in the present example preprocessing group 544) and run on a single TPU only.

Computation group 554 may receive two training tasks, each having a shared preprocessed portion (in the present example preprocessing group 546) and run on two Nvidia k80 GPUs.

Although the embodiments described herein mainly address deep learning applications with NN models, the methods and systems described herein can also be used in other applications, such as in high performance computing (HPC) and machine learning algorithms. Furthermore, although the embodiments described herein mainly address NN training, the methods and systems described herein can also be used in inference, in which computation phases include only forward propagation.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not closed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for training a Neural-Network (NN), the method comprising:
   receiving a plurality of NN training tasks, each training task comprising (i) a respective preprocessing phase that preprocesses data to be provided as input data to the NN, and (ii) a respective computation phase that trains the NN using the preprocessed data; and
   executing the plurality of NN training tasks, including:
      identifying a commonality between the input data required by computation phases of two or more of the training tasks;
      in response to identifying the commonality, executing one or more preprocessing phases that produce the input data jointly for the two or more training tasks;
      assigning the computation phases of the training tasks to multiple processors in accordance with a predefined assignment criterion; and
      executing the computation phases by the multiple processors.

2. The method according to claim 1, wherein the assignment criterion aims to minimize a total execution time of the training tasks.

3. The method according to claim 1, wherein the assignment criterion aims to minimize idle times during computation phases.

4. The method according to claim 1, wherein assigning the computation phases comprises estimating durations of execution of the computation phases, and assigning the computation phases to the processors based on the durations of execution.

5. The method according to claim 4, wherein estimating the durations comprises re-estimating the durations during execution of the computation phases, and reassigning one or more of the computation phases to the processors based on the re-estimated durations of execution.

6. A method for training a Neural-Network (NN), the method comprising:
   receiving a plurality of NN training tasks, each training task comprising (i) a respective preprocessing phase that preprocesses data to be provided as input data to the NN, and (ii) a respective computation phase that trains the NN using the preprocessed data; and
   executing the plurality of NN training tasks, including:
      identifying a commonality between the input data required by computation phases of two or more of the training tasks; and
      in response to identifying the commonality, executing one or more preprocessing phases that produce the input data jointly for the two or more training tasks,
      wherein preprocessing phases of the training tasks are executed by multiple processors, and wherein executing the plurality of NN training tasks comprises assigning the preprocessing phases to the processors in accordance with a predefined assignment criterion.

7. The method according to claim 6, wherein the assignment criterion aims to minimize a total execution time of the training tasks.

8. The method according to claim 6, wherein assigning the preprocessing phases comprises estimating durations of execution of the preprocessing phases, and assigning the preprocessing phases to the processors based on the durations of execution.

9. The method according to claim 1, wherein receiving the plurality of NN training tasks comprises deciding on a maximal number of training tasks for which to produce the input data jointly, based on a total execution time of the training tasks.

10. A system for training a Neural-Network (NN), the system comprising:
    an interface, configured to receive a plurality of NN training tasks, each training task comprising (i) a respective preprocessing phase that preprocesses data to be provided as input data to the NN, and (ii) a respective computation phase that trains the NN using the preprocessed data; and
    one or more processors, configured to execute the plurality of NN training tasks, including:
       assigning the computation phases to the processors in accordance with a predefined assignment criterion;
       identifying a commonality between the input data required by computation phases of two or more of the training tasks; and
       in response to identifying the commonality, executing one or more preprocessing phases that produce the input data jointly for the two or more training tasks.

11. The system according to claim 10, wherein the assignment criterion aims to minimize a total execution time of the training tasks.

12. The system according to claim 10, wherein the assignment criterion aims to minimize idle times during computation phases.

13. The system according to claim 10, wherein the multiple processors are configured to assign the computation phases by estimating durations of execution of the computation phases, and assigning the computation phases to the processors based on the durations of execution.

14. The system according to claim 13, wherein the multiple processors are configured to re-estimate the durations during execution of the computation phases, and to reassign one or more of the computation phases to the processors based on the re-estimated durations of execution.

15. A system for training a Neural-Network (NN), the system comprising:
    an interface, configured to receive a plurality of NN training tasks, each training task comprising (i) a respective preprocessing phase that preprocesses data to be provided as input data to the NN, and (ii) a respective computation phase that trains the NN using the preprocessed data; and
    one or more processors, configured to execute the plurality of NN training tasks, including:
       assigning the preprocessing phases to the processors in accordance with a predefined assignment criterion;
       identifying a commonality between the input data required by computation phases of two or more of the training tasks; and
       in response to identifying the commonality, executing one or more preprocessing phases that produce the input data jointly for the two or more training tasks.

16. The system according to claim 15, wherein the assignment criterion aims to minimize a total execution time of the training tasks.

17. The system according to claim 15, wherein the multiple processors are configured to assign the preprocessing phases by estimating durations of execution of the preprocessing phases, and assigning the preprocessing phases to the processors based on the durations of execution.

18. The system according to claim 10, the multiple processors are configured to decide on a maximal number of training tasks for which to produce the input data jointly based on a total execution time of the training tasks.

19. A method for training a Neural-Network (NN), the method comprising:
- receiving a plurality of NN training tasks, each training task comprising (i) a respective preprocessing phase that preprocesses data to be provided as input data to the NN, and (ii) a respective computation phase that trains the NN using the preprocessed data; and
- executing the plurality of NN training tasks, including:
  - identifying a commonality between the input data required by computation phases of two or more of the training tasks; and
  - in response to identifying the commonality, assigning two or more computation tasks to a same group of one or more processors, and executing one or more preprocessing phases that produce the input data jointly for the two or more training tasks.

20. A system for training a Neural-Network (NN), the system comprising:
- an interface, configured to receive a plurality of NN training tasks, each training task comprising (i) a respective preprocessing phase that preprocesses data to be provided as input data to the NN, and (ii) a respective computation phase that trains the NN using the preprocessed data; and
- one or more processors, configured to execute the plurality of NN training tasks, including:
  - identifying a commonality between the input data required by computation phases of two or more of the training tasks; and
  - in response to identifying the commonality, assigning two or more computation tasks to a same group of one or more processors, and executing one or more preprocessing phases that produce the input data jointly for the two or more training tasks.

* * * * *